United States Patent
Boonekamp (10) Patent No.: US 10,012,783 B2
(45) Date of Patent: Jul. 3, 2018

(54) LIGHTING SYSTEM USING A LIGHT GUIDE AND A LIGHTING METHOD

(71) Applicant: PHILIPS LIGHTING HOLDING B.V., Eindhoven (NL)

(72) Inventor: Erik Paul Boonekamp, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/563,669

(22) PCT Filed: Apr. 1, 2016

(86) PCT No.: PCT/EP2016/057194
§ 371 (c)(1),
(2) Date: Oct. 2, 2017

(87) PCT Pub. No.: WO2016/156562
PCT Pub. Date: Oct. 6, 2016

(65) Prior Publication Data
US 2018/0074250 A1     Mar. 15, 2018

(30) Foreign Application Priority Data

Apr. 2, 2015   (EP) .................................... 15162443

(51) Int. Cl.
*F21V 7/04*     (2006.01)
*F21V 8/00*     (2006.01)
*F21Y 115/10*   (2016.01)

(52) U.S. Cl.
CPC ......... *G02B 6/0038* (2013.01); *G02B 6/0018* (2013.01); *G02B 6/0028* (2013.01); *G02B 6/0061* (2013.01); *G02B 6/0068* (2013.01); *G02B 6/0073* (2013.01); *F21Y 2115/10* (2016.08); *G02B 6/0051* (2013.01); *G02B 6/0055* (2013.01)

(58) Field of Classification Search
CPC .. G02B 6/0038; G02B 6/0018; G02B 6/0028; G02B 6/0061; G02B 6/0068; G02B 6/0073
USPC ........................................... 362/626
See application file for complete search history.

(56) References Cited

U.S. PATENT DOCUMENTS

| | | | | |
|---|---|---|---|---|
| 5,126,882 | A * | 6/1992 | Oe | G02B 6/0033 349/57 |
| 5,584,556 | A | 12/1996 | Yokoyama et al. | |
| 6,215,936 | B1 * | 4/2001 | Yoshikawa | G02B 6/00 362/302 |
| 6,259,854 | B1 * | 7/2001 | Shinji | G02B 6/00 362/625 |

(Continued)

FOREIGN PATENT DOCUMENTS

| | | |
|---|---|---|
| EP | 0878720 B1 | 8/2003 |
| WO | 0102772 A1 | 1/2001 |

*Primary Examiner* — Bryon T Gyllstrom (57) ABSTRACT

A lighting system uses an edge lit waveguide. The bottom has a set of elongate light extraction features for out-coupling light from the light guide towards a reflector which reflects light back into the light guide. The top face of the light guide functions as the output for the lighting system. In some examples it has a set of elongate beam shaping features extending substantially orthogonally to the set of light extraction 5 features for beam shaping of light exiting the top face.

14 Claims, 6 Drawing Sheets

(56) References Cited

U.S. PATENT DOCUMENTS

| | | | | |
|---|---|---|---|---|
| 6,347,874 B1* | 2/2002 | Boyd | ............... | G02B 6/0038 |
| | | | | 349/63 |
| 6,742,907 B2 | 6/2004 | Funamoto et al. | | |
| 7,001,060 B1* | 2/2006 | Kimura | ............... | G02B 6/0053 |
| | | | | 349/63 |
| 7,543,973 B2 | 6/2009 | Shimura | | |
| 8,834,001 B2 | 9/2014 | Lin et al. | | |
| 8,864,359 B1 | 10/2014 | Rinko | | |
| 9,651,728 B2* | 5/2017 | Thompson | ............... | G02B 6/0036 |
| 2002/0135996 A1 | 9/2002 | Suga | | |
| 2004/0190279 A1* | 9/2004 | Kitamura | ............... | G02B 6/0028 |
| | | | | 362/23.09 |
| 2004/0212757 A1 | 10/2004 | Lee et al. | | |
| 2004/0263451 A1* | 12/2004 | Muto | ............... | G02B 6/005 |
| | | | | 345/87 |
| 2005/0117370 A1 | 6/2005 | Kawashima et al. | | |
| 2007/0279727 A1* | 12/2007 | Gandhi | ............... | G02B 6/0035 |
| | | | | 359/242 |
| 2012/0113679 A1* | 5/2012 | Boonekamp | ............... | G02B 6/0063 |
| | | | | 362/607 |
| 2016/0085016 A1* | 3/2016 | Ito | ............... | G02B 6/0035 |
| | | | | 358/484 |

\* cited by examiner (Prior Art)
FIG. 1

LIGHTING SYSTEM USING A LIGHT GUIDE AND A LIGHTING METHOD

CROSS-REFERENCE TO PRIOR APPLICATIONS

This application is the U.S. National Phase application under 35 U.S.C. § 371 of International Application No. PCT/EP2016/057194, filed on Apr. 1, 2016 which claims the benefit of European Patent Application No. 15162443.4, filed on Apr. 2, 2015. These applications are hereby incorporated by reference herein.

FIELD OF THE INVENTION

This invention relates to a lighting system which uses a light guide to define the light output.

BACKGROUND OF THE INVENTION

A light guide (otherwise known as a waveguide) traps light by providing total internal reflection with the light guide. This is achieved by controlling the angles over which light enters the light guide as well as selection of a material with suitable refractive index, which must be higher than the refractive index of the surrounding material, typically air.

Edge lit light guides for back lighting and front lighting of displays are well known, and they are inexpensive and robust.

Known edge lit light guides are designed to provide maximum uniformity of light output across the entire surface of the light guide.

Figure 1:
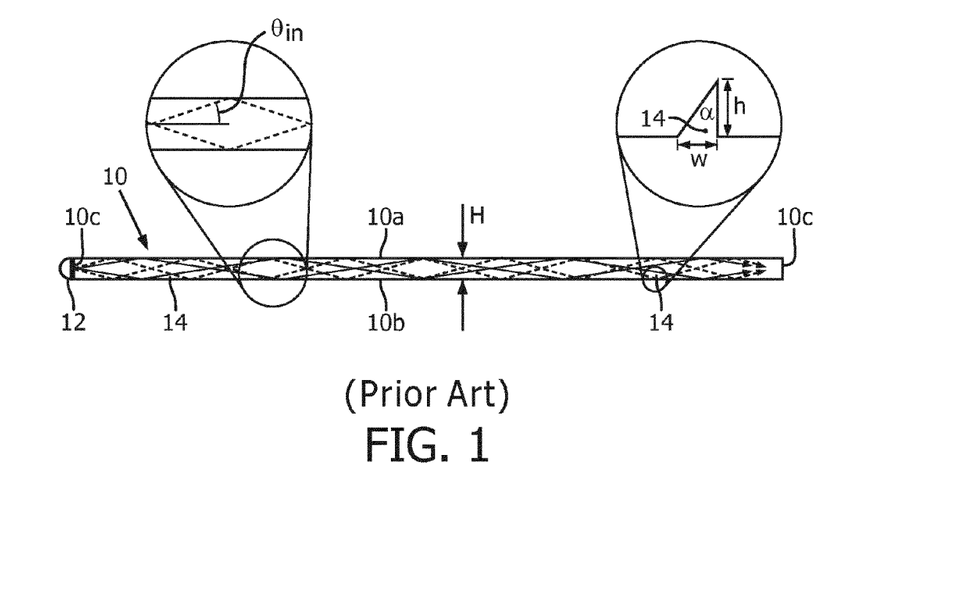
FIG. 1 shows a first example of a known backlight design using an edge-lit light guide.

FIG. 1 shows a schematic image of an edge lit light guide 10. The light guide comprises a waveguide material, such as a slab of solid material with a top face 10a, a bottom face 10b and lateral edges 10c. There are top and bottom edges which cannot be seen in FIG. 1, as the cross section of FIG. 1 is taken in the lateral side-to-side direction. The light guide is generally rectangular in plan view.

From the left side in FIG. 1, light is coupled in from a light source 12 and at the bottom of the light guide several light out-coupling (i.e. light extraction) features 14 (are placed. Light propagates under an angle $\theta_{in}$ inside the light guide with height H. The out-coupling features 14 in this example are drawn as half prisms with a half top angle α, height h, and a width w.

The light guide is formed as a dielectric slab made out of e.g. glass or polycarbonate. In the slab, total internal reflection at the borders keeps the light confined while the light propagates. The edges of the slab are typically used to couple in light and the small light out-coupling features 14 locally couple light out of the light guide. The light extraction is achieved when the light hits a surface with scattering properties, or else the light hits a surface that changes the angles with which light travels within the slab so that the incident angle becomes smaller than the critical angle (with respect to the normal).

In addition to LCD backlighting, light guides are now also being used in office luminaires as well as in outdoor lighting. These new applications have also meant a departure from the flat slab based light guides used in display applications.

Light guides are perfectly suited to spread light evenly over a large surface area, as is desired for the example of LCD backlighting.

However, light guides applied in LED based illumination systems also require beam shaping to keep glare at a sufficiently low level. Glare regulations such as the unified glare rating (UGR) and the so-called L65 performance (which is the luminance in cd/m² of a luminaire at 65 degrees viewing angle with respect to the normal to the luminaire surface) are described by the EN-12464 specification (part 1 of which relates to lighting or indoor work places).

Creation of a low-glare beam with an angle cut-off in all directions is not possible using a single, light guide system and based on a non-collimated light input.

Figure 2:
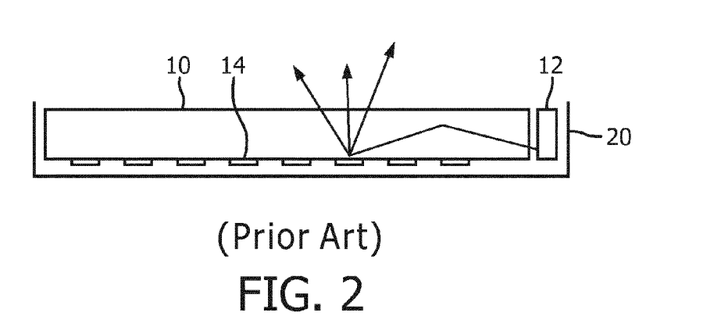
FIG. 2 shows a second example of a known backlight design using an edge-lit light guide.

FIG. 2 shows the configuration of another example of light guide system as used in some luminaires and backlights. As in the example of FIG. 1, it has light extraction features 14, which in this example comprise screen printed or inkjet-printed paint dots on the outside of a clear light guide plate. Light is again injected at one or more edges (straight or curved) of the light guide.

A visually uniform light emitting surface can be optimized when the small paint dots (typically <1 mm) vary in size or density over the surface. However, light is extracted from the light guide in an inefficient way and escapes in all angular directions giving high glare. FIG. 2 also shows a reflector back plate 20 for recycling light which escapes from the wrong side of the light guide.

There is therefore a need for a light guide based lighting system which enables creation of a cut-off in all directions but does not require the in-coupling of collimated light.

US2002135996 discloses a planar light source device comprising a light source arranged at an edge of the light guide pipe comprising light extraction features, the light source device further comprising a reflection sheet arranged to redirect extracted light from the light guide back through across the light guide.

SUMMARY OF THE INVENTION

The invention is defined by the claims.

According to an example, there is provided a lighting system, comprising:

a light guide having a top face and a bottom face and outer edges extending between the top and bottom faces;

a lighting arrangement for coupling light into at least one of the outer edges of the light guide; and a reflector arranged beneath the bottom face having a diffuse reflection function, wherein the light guide comprises a set of elongate light extraction features on the bottom face for out-coupling light from the light guide towards the reflector, each extraction feature extending alongside and essentially over the full length of the lighting arrangement.

Essentially in this respect means for at least 80% of the full length of the lighting arrangement. Elongate in this respect means that the light extraction features have a relatively large length 1 compared to their width w and/or their height h, for example 1 is at least ten, twenty, fifty or hundred times w and/or h, for example 250 times. Conveniently the light extraction features are pillar shaped.

The light guide performs two functions. A first is to extract light preferentially from the bottom face, towards the reflector. After reflection, the same light guide functions acts as an optical transmission plate. It may for example mainly transmit light with a low angle (for example less than 60 degrees) to the normal and this optical transmission then implements a beam shaping function. By the feature that each light extraction feature extends continuously and essentially over the full length of the lighting arrangement, the risk on crosstalk and undesired reflections/refractions, caused by end faces of said light extraction features, is reduced compared to the (risk on) glare resulting from the known light extraction features of US2002136996.

This light guide and reflector arrangement is for example able to use light from standard, non-collimated ("Lambertian") LEDs placed closely to the edge of the guide. Thus, no pre-collimation of light is needed for designing a proper working system. However, the use of collimated light from e.g. a laser light source is equally possible. For example the use of multiple colored lasers is known.

There may be a set of elongate beam shaping features on the top face extending between 85 and 95 degrees to the set of light extraction features, for beam shaping of light exiting the top face. These may be used to provide angular control of the light output.

The light output characteristics then depend on the reflection properties, and the interaction of the newly incident beams with the light guide, including the set of beam shaping features on the top face for examples having this set of beam shaping features. This top face functions as the light output face of the lighting system.

The system can be designed with a customizable appearance and beam profile by suitable design of the set of light extraction features, the properties of the reflector and the spacing of the different components of the system. When a set of beam shaping features is used, it also influences the optical output characteristics.

The orthogonality, or near-orthogonality of the light extraction features and beam shaping features means that those on the bottom face are primarily active in out-coupling the originally coupled in light (since they are arranged across the direction of incidence of the in-coupled light), and they influence the angular spread in the plane including the direction of incidence. The beam shaping features on the top face are primarily responsible for shaping the output beam in a plane perpendicular to the direction of incidence. They may therefore be designed together to achieve a desired 3D directional light output function. Thus, a tailor made beam can be designed to have a selected cut-off in all directions.

The light guide system can be made with a low profile and is simple to construct. It enables a non-collimated light source to be used, such as LEDs without collimation.

At least 95%, and even more preferably at least 98% of the light initially entering the waveguide may be out-coupled from the bottom face towards the reflector. This is ensured by designing the top face to provide total internal reflection for light inside the light guide. Thus, light is only deliberately extracted from the bottom face—although some light leakage will arise. This light leakage can by design be kept below 5% or even below 2%. The light output characteristics can then be controlled by design of the diffusion function implemented by the reflector, and the beam shaping features of the top face when they are also used.

An air gap is for example provided between the bottom face of the light guide and the reflector.

The size of this air gap influences the required spacing of the beam shaping features on the top face, and is thus part of the overall design of the system. The main purpose of the air gap is to create a uniformly illuminated back reflector and thus to create a uniform appearance of the luminaire. For uniform illumination of the reflector and a constant pitch (p), the following relationship may for example be satisfied for the gap size g:

g>1.5 p

The reflector may be a white diffuse reflector. This is simple to manufacture. Alternatively, the reflector may be a specular reflector with a diffuser over the top. This diffuser may comprise a Gaussian diffuser to (better) obtain a highly desired delta-shaped intensity pattern.

The elongate light extraction features preferably extend near parallel (e.g. within 5 degrees of parallel) to an edge into which light is coupled into the light guide. They thus face the incoming light, and perform the light extraction function for the initially coupled light. The elongate light extraction features may comprise elongate pillars extending alongside the length of the lighting arrangement, each with a rectangular or tapered rectangular cross section. Alternatively, they may have a semi-circular cross section. This cross section is perpendicular to the elongate length direction.

For rectangular or tapered rectangular pillars, with a maximum width w, a height h and with the material of the light guide having a refractive index n, the following relationship may be met:

$$1.2 * \tan\left(\arcsin\left(\frac{1}{n}\right)\right) \leq \frac{h}{w} \leq 3 * \tan\left(\arcsin\left(\frac{1}{n}\right)\right)$$ Eq. 1

This equation can be rewritten in a simpler form since:

$$\tan = \frac{\sin}{\cos} = \frac{\sin}{\sqrt{1-\sin^2}}$$ Eq. 2 and $$\sin\left(\arcsin\frac{1}{n}\right) = \frac{1}{n}$$

hence $$\tan\left(\arcsin\frac{1}{n}\right) = \frac{\frac{1}{n}}{\sqrt{1-1/n^2}} = \frac{1}{\sqrt{n^2-1}}$$

Combination of equations 1 and 2 leads to:

$$\frac{1.2}{\sqrt{n^2-1}} \leq \frac{h}{w} \leq \frac{3}{\sqrt{n^2-1}}$$

These relationships enable nearly all light to be extracted from the light extraction features, instead of being reflected internally to the top face where the light may then escape before being passed to the reflector.

If the pillars are arranged with an average pitch p (which pitch may be constant), then preferably:

$$\frac{p}{w} \geq 10$$

This assists in reducing crosstalk.

If the pillars have a tapered cross section, the taper angle is preferably less than 10 degrees, more preferably less than 5 degrees.

The light guide preferably comprises a set of elongate beam shaping features extending essentially fully, i.e. over at least 80%, from one outer edge to the outer edge opposite thereto on the top face, a length direction of the beam shaping elements extending between 85 and 95 degrees to the set of light extraction features, for beam shaping of light exiting the top face.

The elongate beam shaping features preferably extend perpendicularly to an edge into which light is coupled into the light guide. This means they extend parallel to the direction of light insertion into the waveguide and thereby do not perform an extraction function for the initially in-coupled light. The elongate beam shaping features may comprise elongate prism structures, for example with a prism apex facing away from the top surface.

The lighting arrangement preferably comprises an LED arrangement, provided at one edge or at a pair of opposing parallel edges of the light guide.

The invention also provides a lighting method, comprising:

coupling light into at least one outer edge of a light guide which has a top face and a bottom face and outer edges extending between the top and bottom faces;

out-coupling light from the bottom face of the light guide using a set of elongate light extraction features extending alongside and essentially over the full length of the lighting arrangement on the bottom face;

reflecting light which passes out of the bottom face using a reflector having a diffuse reflection function, thereby returning the reflected diffused light into the light guide;

issuing reflected, diffused light as output light from the top face of the light guide.

This method makes use of the light guide for two sequential light processing functions, in order to enable directional control of the beam shape output from an edge lit light guide in two orthogonal directions.

BRIEF DESCRIPTION OF THE FIGURES

Embodiments of the invention will now be described, purely by way of example, with reference to the accompanying drawings, in which.

DETAILED DESCRIPTION OF THE EMBODIMENTS

The invention provides a lighting system comprising using an edge lit waveguide. The bottom has a set of elongate light extraction features for out-coupling light from the light guide towards a reflector which reflects light back into the light guide. The light output from the lighting system is from the top face. The top face may have a set of elongate beam shaping features extending substantially orthogonally to the set of light extraction features, for beam shaping of light exiting the top face.

Figure 3:
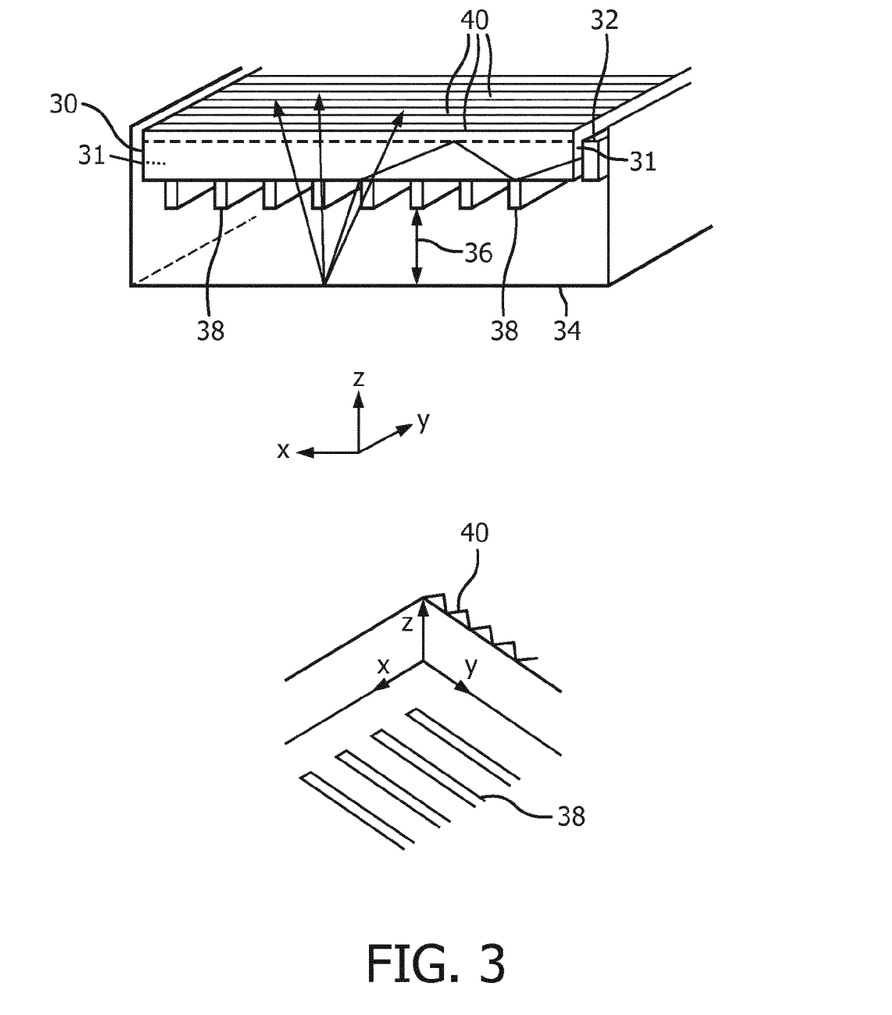
FIG. 3 shows a perspective cross-section of an inventive lighting system.

The basic features of the invention are shown in FIG. 3.

The lighting system comprises a light guide 30 which for example has a rectangular (or square) shape in plan view, and is formed as a plate of optically transparent material. Light is coupled into the light guide from one edge or a pair of facing edges by an array of LEDs 32. These do not require a collimated output, and may for example emit a Lambertian light output.

In some examples, the light guide has optical features on both faces of the plate. The light guide has a typical thickness in the range 1 mm to 4 mm and may for example be made from poly(methyl methacrylate) (PMMA), polycarbonate (PC) or glass. All of the surrounding edges are optically smooth.

A reflective plate 34 is provided beneath the light guide 30, and this may be formed with a diffusive reflective surface, for example a white, diffuse reflective surface. The reflective surface may be formed by coating or the reflector may be formed from a white diffusive reflective material.

An air gap 36 is provided between the reflective plate 34 and the light guide 30.

The light guide has light extraction features 38 on the bottom face of which each extends alongside over at least 90% of the full length of the array of LEDs, and beam shaping features 40 of which each extends on the top face over practically 100% of the distance between two opposing edges 31. The top face is the front side of the light guide from which a light output is projected.

The beam shaping features 40 on the top face for example comprise linear optical features such as prisms or lenticular lenses. They are oriented along the direction extending between opposite edges wherein those edges include the edge or edges at which light is coupled into the light guide. This is shown as the x-direction in FIG. 3.

The beam shaping features and the light extraction features may be formed as an integral part of the light guide, or they may be applied as separate films or layers.

In FIG. 3, linear prisms 40 are applied on or formed into the top face of the light guide.

By way of example, the prisms may be symmetric with a base width of 1 mm and a top angle of 112 deg.

The LEDs have their optical axis in the x direction as well, so that the general light direction within the light guide is in the direction of the x axis. The LED output does not need to be collimated so there is a range of output angles centered around the x-axis both in the plane of the light guide (i.e. in plan view) and also in the top-bottom plane (i.e. the view shown in FIG. 3). This range of angles may nevertheless be sufficiently limited that there is little or no light coupled out directly from the top of the light guide.

There will be a slight light "leakage" to the front, but this will not influence the performance noticeably. Some rays have a complex path in the light guide. Some may travel from one bottom light extraction feature to the other ("cross talk") and then be transmitted through the light guide to the front side of the luminaire, without travelling to the reflector. A sufficiently high value of h/w for the bottom light extraction features helps to reduce the leakage to a very low level, i.e. h/w is preferably in a range of $1.1 <= h/w <= 2.7$ to generally limit the amount of leakage to at the most 2%.

Also, Fresnel reflections contribute to this leakage. Fresnel reflections may be largely eliminated by applying an anti-reflex coating on the light guide surface.

Light which is captured in the light guide and which hits the linear top beam shaping structures 40 will not escape from the light guide, by ensuring that there is total internal reflection at the slab to air interface. This is independent of the type (e.g. prism, or lenticular) of linear structure chosen.

The best control of optical glare is achieved when the full top face of the light guide is covered with these linear beam shaping features. The size of the cross-section of the prismatic features is not important for the optical performance but determines the visual impression of the luminaire. Therefore, micro features (with cross-sectional dimension in the range 10 to 100 μm) can be used as well as macro features (in the mm range). The size of the light guide may for example be of the order hundreds of mm, for example 600 mm×600 mm is a typical dimension for a ceiling tile lighting system.

The bottom of the light guide has light extraction features 38, in the form of rectangular features which are oriented perpendicularly to the linear beam shaping features 40 on the top face, namely in the y-direction. They have a rectangular cross section, i.e. in the x-z plane as shown. This is perpendicular to the general direction of propagation of the light. In general, the rectangular features cover the full width (y-direction) of the light guide. The height/width ratio and pitch of these light extraction features 40 determine the performance of the illumination system.

Figure 4:
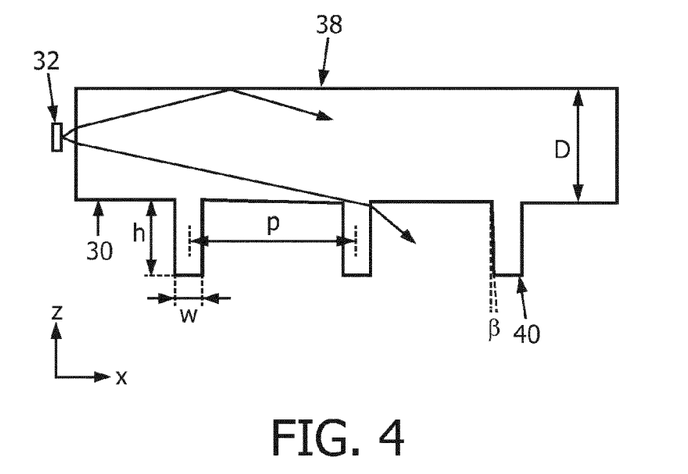
FIG. 4 shows the geometric parameters of one example of the set of light extraction features on the bottom face.

FIG. 4 shows the structure of the rectangular light extraction features in more detail. As shown, each light extraction feature has a height h (in the light output direction, i.e. perpendicular to the plane of the plate, i.e. the z-direction) and a width w (or maximum width w in the case of a tapered shape) in the x-direction. The pitch between the features is p (or the average pitch is p if it is not a constant), and the plate has a depth D.

For full light extraction to the back side of the light guide, i.e. at least 98% and hence a light leakage of at the most 2%, the height to width ratio should fulfill at least equation 1. In equation 1, n is the refractive index of the light guide material.

$$\frac{1.2}{\sqrt{n^2-1}} \leq \frac{h}{w} \leq \frac{3}{\sqrt{n^2-1}}$$

The pitch p between the light extraction features 38 is another design parameter. When the features are too close, optical crosstalk occurs and light, having the "wrong" angles, transmits to the top side of the light guide and may generate glare. Therefore, the pitch between the features should be large enough to avoid too much crosstalk. A rough guide line for the pitch is:

$$\frac{p}{w} \geq 10 \qquad \text{Eq. 3}$$

Figure 5:
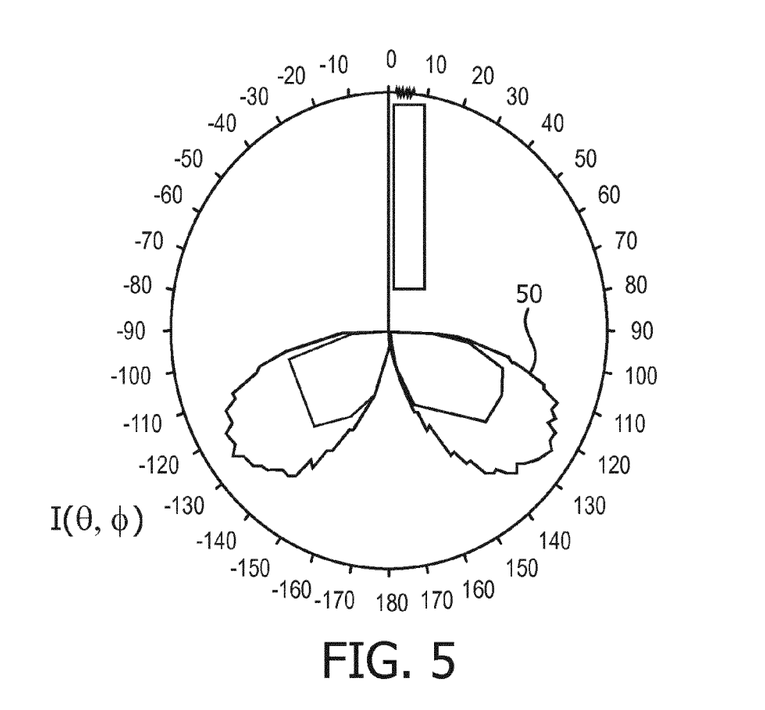
FIG. 5 show the light intensity distribution for light exiting the bottom face.

The plot of FIG. 5 shows the intensity profile of the light escaping from the bottom side of the light guide, based on LED arrays on both opposite edges of the light guide. Plot 50 is the intensity profile in the x-z plane of light escaping from the light guide (with no reflector). The intensity profile shows that virtually all light can be extracted to the bottom side of the light guide. Again, micro structures (10-100 μm) can be used as well as macro structures (mm range) may be used.

Figure 6:
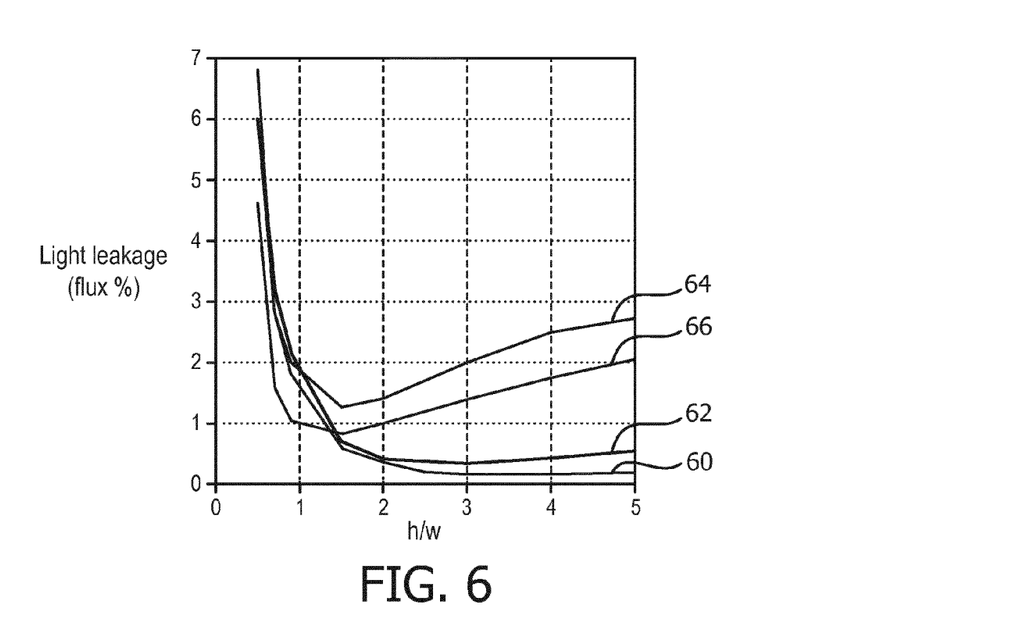
FIG. 6 shows how the efficiency of light extraction from the bottom face depends on the geometry of the set of light extraction features on the bottom face.

FIG. 6 shows graphically the percentage of light leakage to the top side as a function of the height to width ratio and pitch.

Plot 60 is for a pitch 15 mm, plot 62 is for a pitch 10 mm and plot 64 is for a pitch 5 mm. These three plots are for a rectangular cross sectional shapes. Plot 66 is for a pitch of 10 mm but with a tilt angle of 3 degrees applied to the opposite sides so that the shape becomes a trapezium. The tilt angle is shown in FIG. 4 as β, and the features taper to a thinner dimension at their ends remote from the plate.

The taper angle is for example less than 10 degrees, more preferably less than 5 degrees.

At a given pitch, there is an optimum height to width ratio where light leakage to the top face is minimal. In general, light leakage can be limited to less than 1%. When the features are slightly tapered, light leakage increases but is still acceptable The complete lighting system comprises the light guide 30, air gap 36 and reflector 34. The light guide transports the light and couples out the light only to the back side of the light guide. Subsequently, the light scatters diffusely at the reflector plate 34. This scattered light escapes via the linear prism features on the top (front) side of the light guide.

Figure 7:
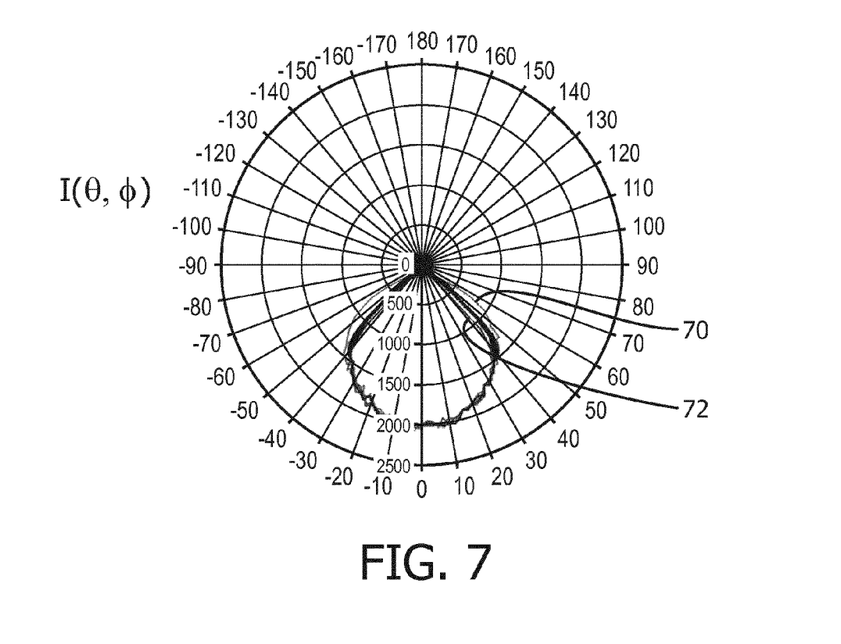
FIG. 7 shows one example of possible light output intensity distribution from the top face of the lighting system.

These prism features on the top face form the beam. An example of the beam output is shown in FIG. 7. This is based on a lighting system with a white diffuse back reflector and with:

area 600 mm×600 mm
pitch p=1.5 mm
width w=0.1 mm
height to width ratio h/w=2
plate depth D=3 mm
top surface prism base width=1 mm
top surface prism top angle=112 degrees
air gap=25 mm.

Plot 70 shows the intensity distribution in the x-direction (i.e. in the x-z plane, parallel to the length of the top side prisms) and plot 72 shows the intensity distribution in the y-direction (i.e. in the y-z plane, parallel to the length of the bottom side projections).

As shown, there is angular control of the output beam in both orthogonal directions (and therefore all directions between).

The light guide performs two functions. First, the light guide transports and couples out the light to one side only. Second, the same light guide acts as an optical transmission plate which transmits light which has been diffusely reflected by the reflector. The reflector properties and the beam shaping properties of the optional top side beam shaping features may in preferred examples give rise to light transmission only for a beam with a low angle with respect to the normal to the plate, for example less than 60 degrees.

The beam shape depicted in FIG. 7 relates to a 600 mm×600 mm lighting tile and produces typically 4000 lm at UGR=17 and $L_{65}$=2600 cd/m².

The UGR and $L_{65}$ values are fully accepted by the current glare norms for office lighting ($UGR_{max}$=19, $L_{65}$<3000 cd/m²).

Figure 8:
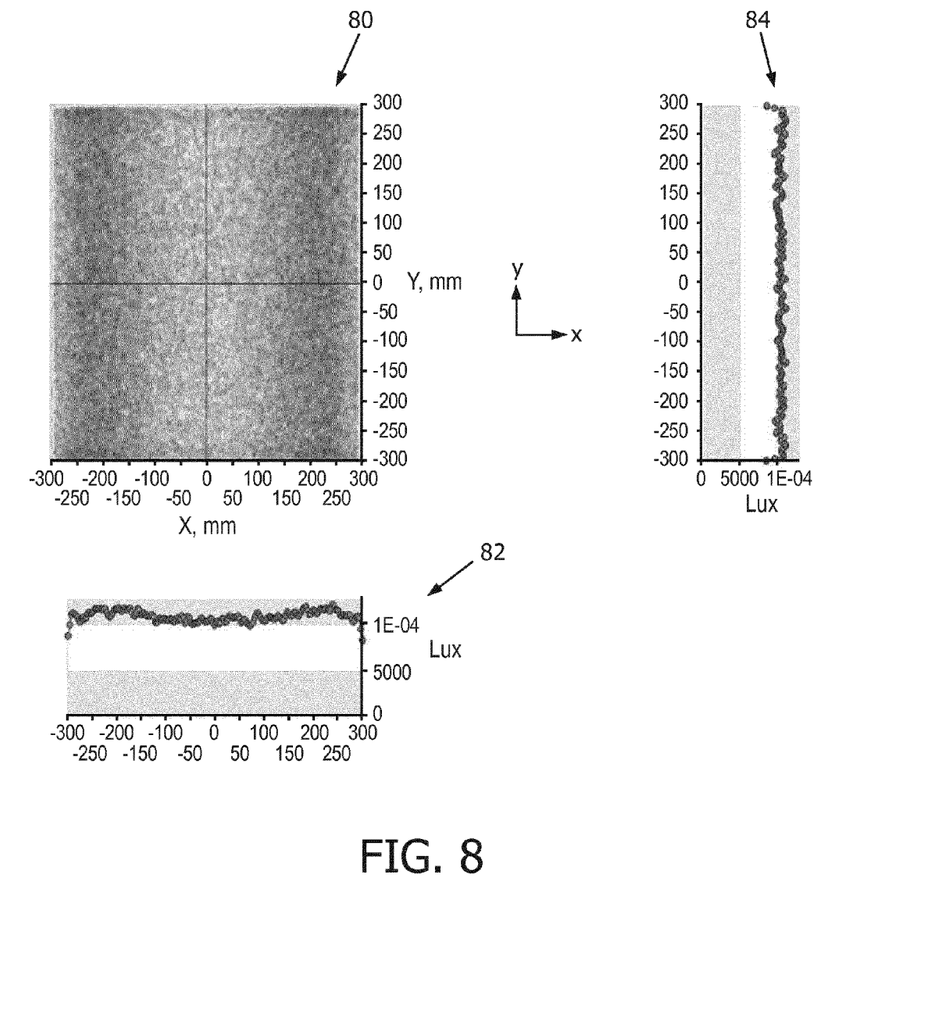
FIG. 8 shows the uniformity of the light output from the top face.

FIG. 8 is used to represent the uniformity graphically. It shows the lighting system top face in plan view (the x-y plane), and shows the illuminance (lm/m²) just above the top side of the light guide. It shows the illuminance as a grey scale image (image 80), and also has graphs of intensity versus position along the x-axis (plot 82) and along the y-axis (plot 84). The uniformity variation is less than 10% over the whole area of the lighting system in this example.

There are many alternatives possible to the basic embodiment described above. A number of alternative features are discussed below.

Many different types of linear structure to form the beam shaping features 40 may be used on the top side. Examples are prisms, lenticular (lens-like) structures, as well as combinations of prismatic and lenticular structures. The surface structures can also have an asymmetric cross sectional shape.

LEDs with different color temperatures may be used. Because of the relatively long optical path through the light guide and to/from the back reflector, the light mixing is excellent.

Light out-coupling uniformity from the bottom face and optical efficiency may be optimized by making a gradient in the density of the light extraction features in the x-direction. In this way the pitch p varies in the x-direction. Alternatively, at constant pitch, the size of the light extraction features may vary in the x-direction (maintaining a constant h/w ratio).

The light guide may be glued to the reflector plate (instead of or as well as using an air gap). If the light extraction features are large enough (and h/w is large enough), almost no light touches the tops of the light extraction features. Therefore, a light guiding laminate may be constructed.

A gluing process may often not be very accurate and precise. A high enough h/w ratio avoids any interaction between the out-coupled light and the glue layer.

Figure 9:
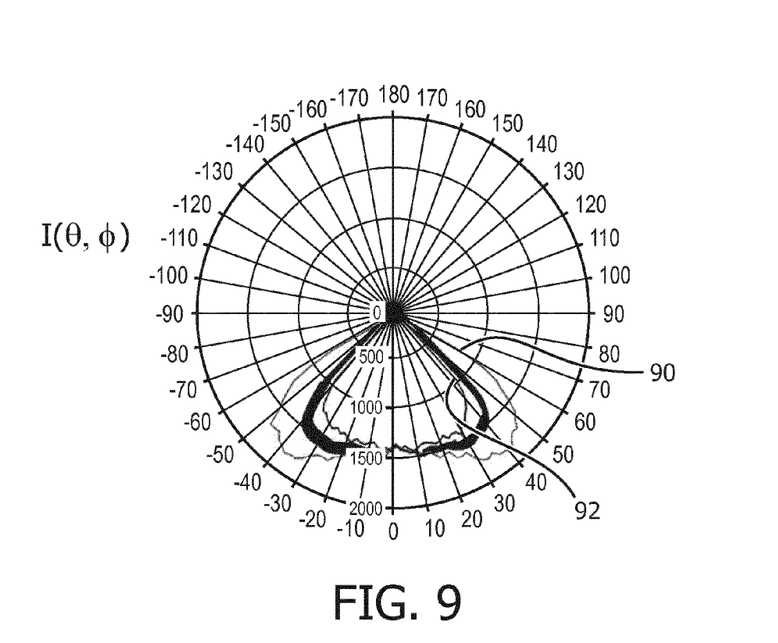
FIG. 9 shows another example of possible light output intensity distribution from the top face of the lighting system.

FIG. 9 shows how the intensity profile may be altered. This may for example be achieved by altering the properties of the reflective back plate. FIG. 9 shows plots corresponding to FIG. 7. Plot 90 shows the intensity distribution in the x-direction (i.e. in the x-z plane, parallel to the length of the top face prisms) and plot 92 shows the intensity distribution in the y-direction (i.e. in the y-z plane, parallel to the length of the bottom face projections).

FIG. 9 relates to a system which is the same as for FIG. 7 but with a specular reflective back plate (i.e. a mirror surface) combined with a Gaussian diffuser film on top, with no optical contact between them. This film spreads a parallel light beam into a Gaussian distribution in this example with a Gaussian spread σ of 20 degrees.

Thus, the design giving the response of FIG. 9 has:
area 600 mm×600 mm
pitch p=1.5 mm
width w=0.1 mm
height to width ratio h/w=2
plate depth D=3 mm
top surface prism base width=1 mm
top surface prism top angle=112 degrees
air gap=25 mm.

A highly desirable delta-shaped intensity pattern is obtained as shown in FIG. 9. When the light guide has LEDs on one in-coupling side only, an asymmetric beam shape is obtained, whereas FIG. 9 shows a symmetrical response based on opposing LED arrangements.

The back reflector may also be modified by screen printed or 3D printed reflective features. The reflector may also contain a luminescent material. This luminescent reflector can be combined with light sources able to excite this wavelength converting material (e.g. blue LEDs).

Figure 10:
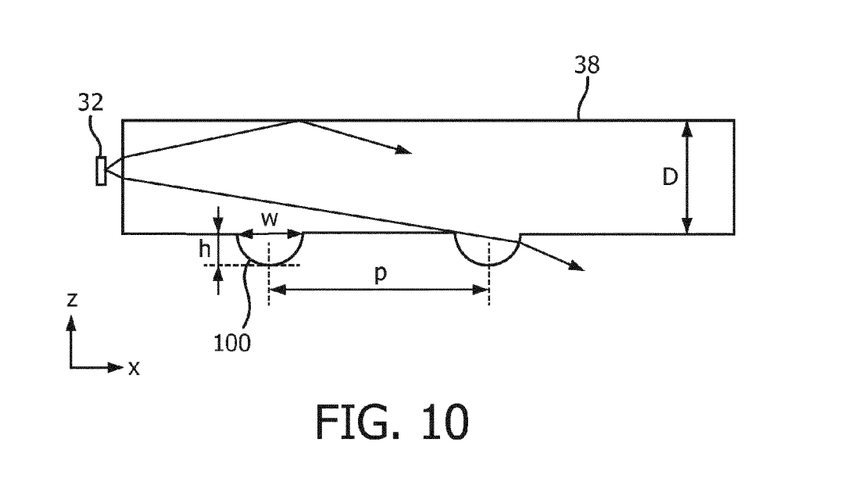
FIG. 10 shows the geometric parameters of another example of the set of light extraction features on the bottom face.

The example above makes use of rectangular or tapered rectangular light extraction features on the bottom face. FIG. 10 shows light extraction features 100 in the form of half cylinders, with a semi-circular cross sectional shape.

The beam shaping features on the top face may be very small and shallow, for example the may define a subtle linear (decorative) structure. As the optical function of the beam shaping features on the top face is decreased, the intensity profile produced by the lighting system may for example tend towards a Lambertian profile.

At the limit, there may not be any beam shaping features on the top face, if for example a Lambertian intensity profile is desired. The optical function is then implemented primarily by the characteristics of the reflector. Thus, the beam shaping features on the top face of the light guide are optional.

The appearance of the luminaire can be influenced by the placement of the light extraction features and the beam shaping features and the type of back reflector (white, screen printed pattern on a metal plate etc.). The light extraction features on the bottom face may be of variable length and they can be arranged in various patterns and arrangements. The light extraction features on the bottom face should be oriented in the y direction.

The invention is if interest for both indoor and outdoor LED illumination systems. The examples given above are focused on office lighting systems but the invention is not intended to be limited to such applications.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting system, comprising:
 a light guide having a top face and a bottom face and outer edges extending between the top and bottom faces;
 a lighting arrangement for coupling light into at least one of the outer edges of the light guide; and
 a reflector arranged beneath the bottom face having a diffuse reflection function,
 wherein the light guide comprises a set of light extraction features on the bottom face for out-coupling light from the light guide towards the reflector, each light extraction feature extending alongside and essentially over the full length of the lighting arrangement,
 wherein the light extraction features have a maximum width w and a height h and the material of the light guide has a refractive index n,
 wherein:

$$\frac{1.2}{\sqrt{n^2-1}} \leq \frac{h}{w} \leq \frac{3}{\sqrt{n^2-1}}.$$

2. A lighting system as claimed in claim 1, wherein the light extraction features comprise pillars having a length l, wherein the length l is at least hundred times larger than the width w and/or the height h.

3. A lighting system as claimed in claim 1, further comprising an air gap (36) between the bottom face of the light guide and the reflector which has a height of more than 1.5 times the average pitch between the light extraction features.

4. A lighting system as claimed in claim 1, wherein the reflector is a white diffuse reflector or a specular reflector with a Gaussian diffuser over the top.

5. A lighting system as claimed in claim 1, wherein the light extraction features extend between −5 degrees and +5 degrees to an edge into which light is coupled into the light guide.

6. A lighting system as claimed in claim 1, wherein the elongate light extraction features comprise pillars extending alongside the length of the lighting arrangement, each with a rectangular or tapered rectangular cross section.

7. A lighting system as claimed in claim 6, wherein each lighting extraction feature has a tapered cross section with a taper angle of less than 10 degrees, more preferably less than 5 degrees.

8. A lighting system as claimed in claim 1, wherein the lighting extraction features are arranged with an average pitch p, and wherein:

$$\frac{p}{w} \geq 10.$$

9. A lighting system as claimed in claim 1, wherein the light extraction features comprise pillars extending alongside the length of the lighting arrangement, each with a semi-circular cross section.

10. A lighting system as claimed in claim 1, wherein the light guide comprises a set of beam shaping features on the top face, a length direction of the beam shaping elements extending between 85 and 95 degrees to the set of light extraction features, for beam shaping of light exiting the top face and each beam shaping feature extending essentially fully from one outer edge to the opposite outer edge on the top face.

11. A lighting system as claimed in claim 10, wherein the beam shaping features comprise prism structures.

12. A lighting system as claimed in claim 1, wherein the lighting arrangement comprises an LED arrangement provided at one edge or at a pair of opposing parallel edges of the light guide.

13. A lighting method, comprising:
coupling light into at least one outer edge of a light guide which has a top face and a bottom face and outer edges extending between the top and bottom faces;
out-coupling light from the bottom face of the light guide using a set of light extraction features extending alongside and essentially over the full length of the lighting arrangement on the bottom face;
reflecting light which passes out of the bottom face using a reflector having a diffuse reflection function, thereby returning reflected, diffused light into the light guide; and
issuing reflected, diffused light as output light from the top face of the light guide,
wherein the light extraction features are fulfilling the equation:

$$\frac{1.2}{\sqrt{n^2-1}} \leq \frac{h}{w} \leq \frac{3}{\sqrt{n^2-1}}$$

with
n being the refractive index of material of the light guide;
w and h being respectively a maximum width and a height of the light extraction features.

14. A method as claimed in claim 13, wherein providing output light from the top face of the light guide comprises using a set of beam shaping features extending essentially fully from one outer edge to the opposite outer edge on the top face, a length direction of the beam shaping elements extending between 85 and 95 degrees to the set of light extraction features, thereby beam shaping the output light exiting the top face.

* * * * *